Figure 1:
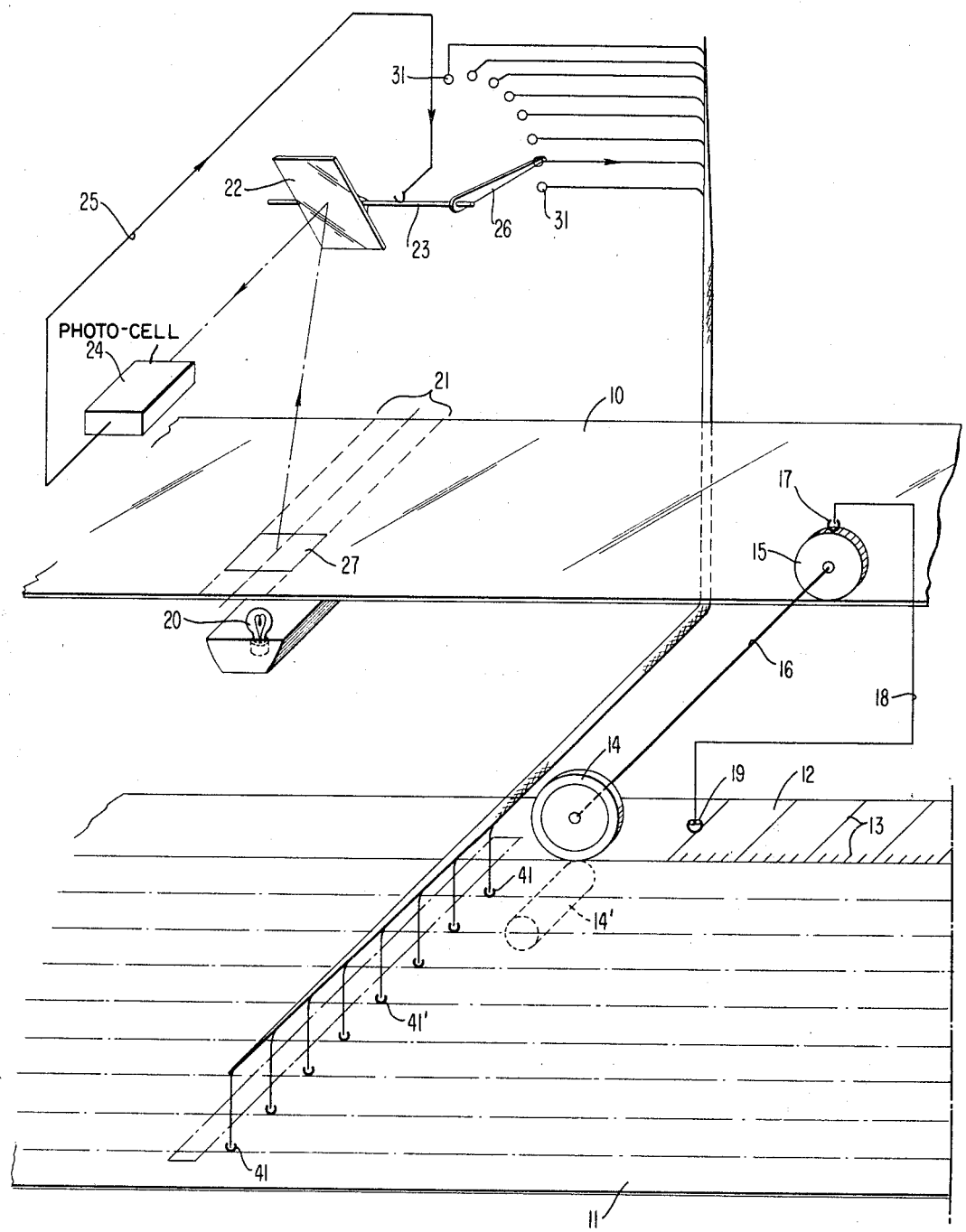

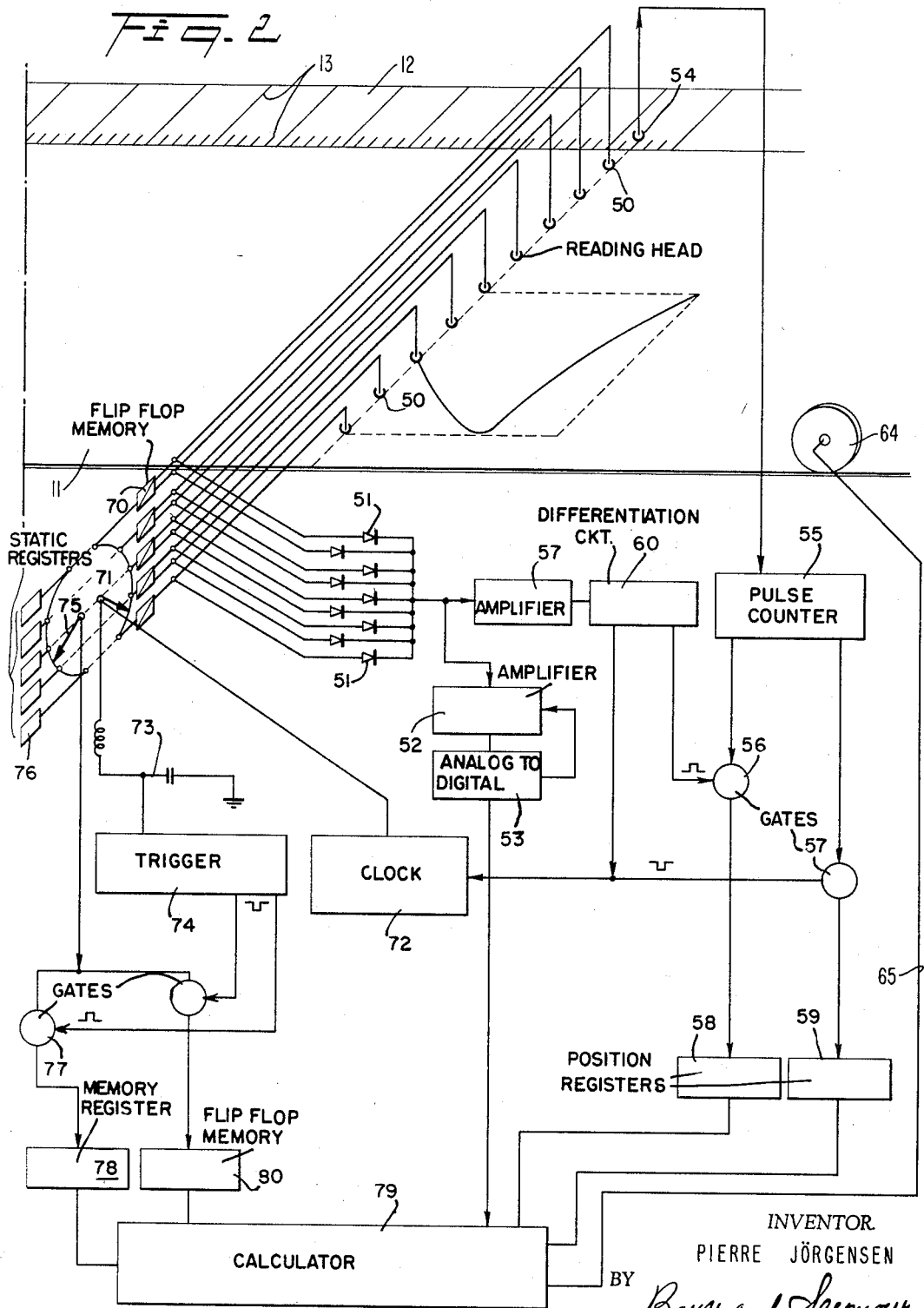

United States Patent Office 3,410,643
Patented Nov. 12, 1968

3,410,643
APPARATUS FOR DETECTING AND RECORDING THE LOCATIONS OF DEFECTS IN SHEET MATERIAL IN TWO DIMENSIONS
Pierre Jörgensen, l'Hay les Roses, Val-de-Marne, France, assignor to Compagnie de Saint-Gobain, Neuilly-sur-Seine, France
Filed Apr. 10, 1962, Ser. No. 186,494
Claims priority, application France, Apr. 14, 1961, 858,779
6 Claims. (Cl. 356—200)

This invention relates to the locating and recording of imperfections in a continuously manufactured product, either as a continuous sheet or as distinct elements.

In our process, the defects are detected by at least one and preferably several inspection devices for example optical such as those described in the invention of Gaffard, assigned to the assignee of the application, filed in the United States Patent Office, bearing Ser. No. 158,277, now Patent No. 3,361,025, and Ser. No. 158,278, now Patent No. 3,338,130, and electromagnetic devices such as those described in the French Patent 1,165,687, these devices being disposed one after another over the product to be inspected.

The defects are recorded in a magnetic tape moving synchronously with the product. The reading of the information recorded in the magnetic tape permits, at the desired time and when needed, to evaluate the characteristics of the defects (position and severity) in order to eliminate the defective articles if they are distinct elements, or to cut the product if it is a continuous sheet.

The invention is not limited to the use of optical and electromagnetic inspection devices. The input devices may, for example, function on various principles for example mechanical (feeling device), pneumatic, electrical, etc.

This invention is particularly useful in the manufacture of glass sheet to accomplish automatic cutting of continuous sheet.

The inspection of sheet glass has been carried out visually in the past, the moving sheet passing beneath an inspector who locates and marks the location of the defects. Some defects are invisible to the human eye and some escape observation, which results in imperfect cutting. Another difficulty has arisen from lack of ability, in the past, to exactly mark the location and the limits of a defect and this has resulted in imperfect cutting.

The objects are accomplished, generally speaking, by a method of locating and recording imperfections in a moving sheet product which comprises moving a sheet along a course, moving magnetic tape along a similar course, continuously scanning the sheet from edge to edge by at least a beam, intercepting the beam or beams by means responsive to modifications of the beams caused by imperfections in the sheet, and transforming the modifications to electromagnetic action adjacent the tape and thereby magnetizing the tape to locations in the tape corresponding to the locations of the imperfections in the sheet, the intensity of the magnetization on the tape being proportional to the severity of the imperfection. As to apparatus the objects are accomplished by apparatus for the locating and recording of defects in a moving band which comprises scanning means including a beam directed on the band, a detector, responsive to modifications of the beam, aligned with the beam, a magnetic tape moving at a speed which is a function of the speed of the band, and a magnetic head adjacent the tape energized by the detector to spot magnetize the tape.

In the preferred form of the invention a permanent record is made on magnetizable tape of defects in the sheet, the tape being proportioned in size and speed to the size and speed of the sheet, the location of defects being electromagnetically recorded in the tape by longitudinal and lateral coordinates, corresponding to like coordinates in the sheet. In an extension of the invention the tape is used to guide cutters or to activate cutting mechanism.

In the drawings, which are diagrammatic, and in which proportions are for the purposes of ready comprehension, FIG. 1 illustrates in perspective the marking of defects in electromagnetic tape;

FIG. 2 illustrates in perspective the reading of the tape and its use for the control of cutting.

Referring to the numerals of FIG. 1, a glass sheet 10, having issued from between the polishers, moves toward the right at uniform speed in accordance with standard practice. A magnetic tape 11 moves alongside the sheet at a uniform speed which is proportioned to the speed of the sheet; it can move at equal or greater speed but preferably it moves at a reduced speed, for instance at a speed of 20 centimeters per meter of the sheet. The width of the tape, for example, bears the relation to the width of the sheet that the units lengths of the tape bear to the unit lengths of the sheet. Then the longitudinal and lateral coordinates of the sheet and tape will be exactly proportioned and any defect marked on the tape will accurately locate the defect in the sheet. The longitudinal coordinates can be applied directly to the tape but it is better to apply them to a magnetizable strip 12 attached to the tape and in effect forming a part of its outside the proportioned part. The strip can be marked in advance as at 13 or the markings can be electromagnetically made as the tape progresses.

Apparatus for electromagnetically marking the tape in lengths proportioned to lengths of the sheet is illustrated by rollers 14, 15, connected together by appropriate means 16, which are circumferentially proportioned to the respective speeds of the sheet and the tape. The roller 15 driven by the sheet comprises a reluctance wheel which during its revolution energizes the magnetic pick up 17 which charges a line 18 and a recording magnetic head 19 which spot magnetizes the tape 12. By means of the shaft 16, the revolution of the roller 15 drives the roller 14 which with roller 14' comprises capstan and pinch roller for driving the tape 11.

The scanning of the sheet is accomplished for example by a source of light located beneath the sheet the beams of which equally illuminate the whole width of the sheet in a band 21. The light strikes a mirror 22 which is mounted on a rocking shaft 23 which causes the mirror to scan the sheet from side to side continuously. The beams of light are directed to photoelectric cell 24 which is akin to the mechanism of the identified cases. The beam is constant and so is the output of the cell until the light is diffused or deflected by an imperfection in the sheet, at which time the line 25 is energized and its energy is transmitted to one of the terminals 31 according to the position of contact 26, which turns with shaft 23 and the mirror.

This kind of inspection device is elsewhere claimed and is only described for a better understanding of the system described below.

As shown in FIG. 1 the beam illuminates an area 27; if a defect is in the area, the current flows through a contact 31 to a magnetic recording head 41 which is located contiguous to the tape in a like position. The tape is spot magnetized until the scanning beam of area 27 is replaced by the scanning beam from the adjacent area, or, more accurately, until the scanning beam is no longer affected by the particular imperfection.

As shown, the apparatus divides the moving sheet into eight sections, which can be more or less as desired. The sections are represented by switch contacts 31 which are connected respectively to magnetic recording heads 41.

The tape is started with a major division 13 in coordination with a spot on the glass, or with the leading edge of the sheet. While moving, the glass sheet drives the reluctance wheel 15 which energizes the pick up 17 and through the line 18 forms on the strip 12 the longitudinal divisions such as 13 by means of the recording head 19.

The transversal location of imperfections is applied to the tape by spot magnetization in one of the tracks passing beneath the recording heads 41, as required by the scanning beam in coordination with the longitudinal divisions. The record formed is enduring and the tape may be employed to control cutting. Apparatus for reading and interpreting the tape is schematically indicated in FIG. 2.

In FIG. 2 the tape 11 is shown as passing beneath a number of reading heads 50 which is equal to the number of recording heads which acted on the tape in FIG. 1. These reading heads are placed on the tracks over which recording heads passed. The reading heads are unaffected until one of them passes above a magnetized spot whereupon it electromagnetically reacts to the magnetization of the spot and sends an impulse to a diode 51. Each reading head 50 is connected to its own diode 51 and all the diodes 51 are connected to a single amplifier 52 which takes the crest voltage of the signal and retains it long enough for a measure by an analog digital converter 53 which is connected to it, to determine its amplitude. At about the same time that the reading head 50 transmits the magnetic record to the diode a reading head 54 reports continuously the measured positions within which the defects fall and transmits them to an electronic pulse counter 55 which transmits the signal, through two controlled transfer gates 56 and 57 to the longitudinal registers 58 and 59.

The reading heads 50 also supply, through diodes 51, the currents which give the axial positions at the beginning and at the end of the defect. This circuit includes the amplifier 52 which delivers a continuous signal which continues throughout the passage of the defect record beneath the reading head. As soon as the continuous signal corresponding to the beginning of the defect is received that signal commands the controlled transfer gate 56 by means of the RC differentiating circuit 60. When the end of the defect has gone out of range of the reading heads 50 no signal is forwarded to the amplifier 57 which ceases to supply voltage. The RC differentiating circuit 60 gives at this time a negative pulse to the controlled transfer gate 56. Then the longitudinal position of the defect located in the longitudinal pulse counter 55 flows through the open gate 57 into the end longitudinal position register 59.

The determination of the lateral coordinates at the beginning and the end of the defect is obtained as follows:

The reading heads 50 are each connected to a flip flop memory 70. When a defect has been detected the flip flop, which corresponds to the reading heads, passes from a 0 reading to a positive or 1 reading, which is retained. The series of flip flop 70 is explored by an electronic commutator 71 which is released by the negative impulse which arose from the reading of the axial coordinate at the end of the defect and which causes the functioning of the analytical command apparatus. Actually the device 72 is a clock triggered by the negative pulse flowing from the RC differentiating circuit 60 at the end of the defect. During the exploration of the flip flop 70, if one of them appears charged or in state 1, then the outgoing signal of the commutator is sent through a resistance-capacity system 73 and received in a positive and negative trigger pulse forming 74. When commutator 71 meets the first flip flop in the state 1, the pulse forming 74 gives a positive pulse opening the transfer gate 77.

While one contact 71 of the commutator inspects the flip flop such as 70 another synchronous contact 75 mounted on the same shaft is connected with the corresponding static register 76 giving the instantaneous lateral coordinate of the analysed track. Then if the gate of the transfer device 77 is open, the coordinate corresponding to the beginning of the transverse position or the minimal coordinate of the defect flows through the transfer gate into the memory register 78, to be used by a calculator 79, for example. One thus obtains a reading of the minimum transverse size of the defect. In the same way an impulse from the end of the signal yields the maximum transverse size registered in flip flop memory 80.

The process can employ different instrumentalities. For example, the inspection apparatus may be composed of a plurality of elementary inspection units regularly distributed throughout the width of the objects being inspected, each of these being directed to a line or band and transmitting information concerning the area inspected to a recording head in an equivalent track on the tape. One can equally use a single inspecting organ which moves transversely continuously as shown in FIG. 1. In each instance it is recommended that the bands of inspection should overlap so that no defect can escape detection.

Instead of using a single inspecting apparatus one may use several distributed at various points along the path of the sheet and the information transmitted by these several apparatus, when they are in line may be superimposed at a single point above the tape. The amplitude of the information may be registered on the tape with an intensity proportional to the magnitude or severity of the defects. In general when several inspecting apparatus are in service and emitting in turn information relating to a defect of the product being inspected the corresponding point on the tape will only be related to the maximum defect. There has already been proposed, but not in a way anticipatory of this invention, to discover and report the various defects in a glass sheet passing before the discovery apparatus but the signals which such apparatus propose to furnish relative to a defect are too many in number to be used as they are for automatic cutting processes as automatic installations which might be provided to cut the sheet can only work with a minimum of parameters per defect. In this invention, as applied to automatic cutting, it suffices to send to the cutting machine information defining the region of the sheet in which the defect occurs, regardless of its nature. This information is registered on the tape and consists essentially of the outer boundaries of the defect both longitudinally and laterally together with the maximum of severity of the defect in the rectangular area containing it. This recording of the position of the defects permits the use of the cutting machine to eliminate during the cutting, the area involving the defect while taking into consideration the requirements of the most advantageous cutting program and the requirements in respect of the quality needed.

As many apparently widely different embodiments of the present invention may be made without departing from the spirit and scope thereof, it is to be understood that the invention is not limited to the specific embodiments.

What is claimed is:

1. Apparatus for detecting and recording in Cartesian coordinates the locations of imperfections in a ribbon of glass moving in the direction of its length, comprising, fixed light-projecting means for illuminating with uniform intensity, an area of one face of the ribbon, of limited and uniform dimension in the direction of length thereof and extending from edge to edge thereof, means for moving a magnetizable tape along a path and in synchronism with movement of the ribbon, a plurality of inscription heads spaced in a row transversely of and adjacent said path, a photoelectric cell, light-reflector means, means mounting said light-reflector means for oscillation to reflect sequentially to said cell, light from said light-projecting means traversing said ribbon at successive increments of area of the illuminated area thereof, and means operated in synchronism with oscillation of said light-reflector means, to electrically connect each said inscription head in succession, with said cell.

2. The apparatus of claim 1, the number of said inscription heads corresponding in number and succession to the number and succession of increments of area of said illuminated area of the ribbon, said last-named means successively electrically connecting each inscription head to said cell at the time said light-reflector means reflects light to said cell, traversing the corresponding increment of area of said illuminated area.

3. The apparatus of claim 1, an auxiliary inscription head fixed adjacent said path and effective to inscribe magnetic spots in a tape moving along said path, and means to energize said auxiliary inscription head at predetermined equal increments of travel of the ribbon.

4. The apparatus of claim 3, said means to energize said auxiliary inscription head comprising a wheel frictionally engaging the ribbon and rotated by movement thereof in the direction of its length, an electrical connection between said wheel and said auxiliary inscription head, and means fixed with said wheel and operating to periodically energize said auxiliary inscription head.

5. The apparatus of claim 4, said wheel also forming a part of the means for moving the magnetic tape along its path.

6. The apparatus of claim 1, said means mounting said light-reflector means, comprising a rotatable shaft, a contact arm fixed with said shaft radially thereof, said last-named means comprising a plurality of spaced contacts disposed about said shaft and successively engaged by said contact arm during rotation of said shaft, a plurality of electrical connections each connecting a respective one of said contacts with a respective one of said inscription heads, and a circuit connection between said cell and said contact arm.

References Cited

UNITED STATES PATENTS

| | | | |
|---|---|---|---|
| 2,156,289 | 5/1939 | Hoy | 346—135 |
| 2,436,829 | 3/1948 | Roth | 335—61.12 |
| 2,719,235 | 9/1955 | Emerson | 88—14 X |
| 2,812,447 | 11/1957 | Mac Martin et al. | 250—219 X |
| 2,848,107 | 8/1958 | Juengst et al. | 250—219 X |
| 2,909,660 | 10/1959 | Alexander | 346—33 X |
| 2,930,228 | 3/1960 | Lawrence et al. | 346—33 X |
| 2,993,402 | 7/1961 | Dunipace et al. | 88—14 |
| 3,040,307 | 6/1962 | West | 340—174.1 |
| 3,049,697 | 8/1962 | Slattery et al. | 340—174.1 |
| 3,073,212 | 1/1963 | Dunsheath | 88—14 |
| 3,100,264 | 8/1963 | Jaffe et al. | 250—203 |
| 3,191,857 | 6/1965 | Galey et al. | 83—71 X |
| 3,205,740 | 9/1965 | Groves et al. | 83—71 |

JEWELL H. PEDERSEN, *Primary Examiner.*

A. A. KASHINSKI, *Assistant Examiner.*